US 8,416,841 B1

(12) United States Patent
Tarn et al.

(10) Patent No.: US 8,416,841 B1
(45) Date of Patent: *Apr. 9, 2013

(54) MULTIPLE-INPUT MULTIPLE-OUTPUT (MIMO) DECODING WITH SUBCARRIER GROUPING

(75) Inventors: Hai-Jo Tarn, San Jose, CA (US); Raied N. Mazahreh, Cottonwood Heights, UT (US); Raghavendar M. Rao, Austin, TX (US)

(73) Assignee: Xilinx, Inc., San Jose, CA (US)

( * ) Notice: Subject to any disclaimer, the term of this patent is extended or adjusted under 35 U.S.C. 154(b) by 517 days.

This patent is subject to a terminal disclaimer.

(21) Appl. No.: 12/623,624

(22) Filed: Nov. 23, 2009

(51) Int. Cl.
  H04B 3/46 (2006.01)
(52) U.S. Cl. .................................. 375/224
(58) Field of Classification Search ............... 375/224
  See application file for complete search history.

(56) References Cited

U.S. PATENT DOCUMENTS

| | | | |
|---|---|---|---|
| 4,727,503 A | 2/1988 | McWhirter | |
| 4,777,614 A * | 10/1988 | Ward | 708/607 |
| 4,823,299 A * | 4/1989 | Chang et al. | 708/446 |
| 5,018,065 A * | 5/1991 | McWhirter et al. | 712/19 |
| 5,323,335 A * | 6/1994 | Mitchell | 702/196 |
| 5,475,793 A * | 12/1995 | Broomhead et al. | 706/14 |
| 6,675,187 B1 * | 1/2004 | Greenberger | 708/622 |
| 7,069,372 B1 * | 6/2006 | Leung et al. | 710/306 |
| 7,120,658 B2 * | 10/2006 | Nash | 708/405 |
| 7,489,746 B1 * | 2/2009 | Awater et al. | 375/341 |
| 7,606,207 B2 | 10/2009 | Becker et al. | |
| 7,685,219 B2 | 3/2010 | Li | |
| 7,933,353 B2 | 4/2011 | Maltsev et al. | |
| 8,190,549 B2 | 5/2012 | Yang et al. | |
| 2003/0018675 A1 | 1/2003 | Asai et al. | |
| 2004/0071207 A1 | 4/2004 | Skidmore et al. | |
| 2008/0028015 A1 | 1/2008 | Seki | |
| 2009/0110120 A1 | 4/2009 | McNamara et al. | |
| 2009/0116588 A1 * | 5/2009 | McNamara et al. | 375/340 |
| 2009/0310656 A1 | 12/2009 | Maltsev et al. | |
| 2011/0125819 A1 * | 5/2011 | Mazahreh et al. | 708/207 |
| 2011/0264721 A1 | 10/2011 | Patel et al. | |

OTHER PUBLICATIONS

Omidi, "Parallel structures for joint channel estimation and data detection over fading channels", IEEE Journal on Selected Areas in Communications, vol. 16 , Issue: Dec. 9, 1998, pp. 1616-1629.*

(Continued)

Primary Examiner — Juan A Torres
(74) Attorney, Agent, or Firm — LeRoy D. Maunu; Lois D. Cartier

(57) ABSTRACT

Multiple input multiple output (MIMO) receiver circuitry is described. In one circuit, input circuitry provides a matrix of unresolved symbols received from a plurality of receive antennas. Channel estimation circuitry constructs a plurality of channel matrices including at least two channel matrices corresponding first and second subcarriers, respectively. A preprocessing circuit receives input from the plurality of channel matrices and interleaves retrieved input into an input matrix. A first systolic array includes boundary cells and internal cells. The boundary cells and internal cells are configured to perform triangulation and back-substitution on the input matrix to produce an output matrix. A second systolic array performs right and left multiplication operations and cross-diagonal transpose on the output matrix to produce a weighted matrix. An output circuit multiplies the weighted matrix by the matrix of unresolved symbols from the input circuitry to produce an estimate of isolated symbols corresponding to the unresolved symbols.

20 Claims, 9 Drawing Sheets

OTHER PUBLICATIONS

Ma, Lei., "Modified Givens Rotations and Their Application to Matrix Inversion," *Proc. of the International Conference on Acoustics, Speech and Signal Processing (ICASSP 2008)*, Mar. 31, 2008, pp. 1437-1440, IEEE, Piscataway, New Jersey, USA.

Kim, Hun Seok et al., "A Practical, Hardware Friendly MMSE Detector for MIMO-OFDM-Based Systems," *EURASIP Journal on Advances in Signal Processing*, pp. 1-14, Hindawi Publishing Corp., New York, New York, USA.

U.S. Appl. No. 12/839,198, filed Jul. 19, 2010, Rao.

Bellis, S. J. et al., "Alternative systolic array for non-square-root Cholesky decomposition," *IEEE Proc.-Comput. Digit. Tech.*, Mar. 1997, pp. 57-64, vol. 144, No. 2, IEEE, Piscataway, New Jersey, USA.

Brent, Richard P., *Computing the Cholesky Factorization Using a Systolic Architecture*, Sep. 1982, pp. 1-15, TR 82-521, Cornell University, Department of Computer Science, Ithaca, New York, USA.

Porta, Tiba, *A Programmable Systolic Array for Factorial Data Analysis Part I: Matrix Computations*, Jun. 1987, pp. 1-17, Research Report YALEU/DCS/RR-542, Yale University, Department of Computer Science, New Haven, Connecticut, USA.

Salmela, Perttu et al., "DSP Implementation of Cholesky Decomposition," *Proc. of the 2006 Joint IST Workshop and Symposium on Trends in Communications (sympoTIC '06)* Jun. 27, 2006, pp. 6-9, IEEE, Piscataway, New Jersey, USA.

Wyrzykowski, R. et al., "One-dimensional processor arrays for linear algebraic problems," *IEEE Proc.-Comput. Digit. Tech.*, Jan. 1995, pp. 1-4, vol. 142, No. 1, IEEE, Piscataway, New Jersey, USA.

Yang, Depeng et al., "An FPGA Implementation for Solving Least Square Problem," *Proc. of the 2009 17th IEEE Symposium on Field Programmable Custom Computing Machines*, Apr. 5, 2009, pp. 303-306, IEEE Computer Society, Washington, DC, USA.

Altera Corp., *QR Matrix Decomposition*, Application Note AN-506-2.0, Feb. 2008, pp. 1-55, Altera Corporation, San Jose, California, USA.

Boher, Laurent et al., "Analysis of CORDIC-based Triangularization for MIMO MMSE Filtering," *Proc. of the 2008 IEEE International Symposium on Circuits and Systems (ISCAS 2008)* May 18, 2008, pp. 948-951, IEEE, Piscataway, New Jersey, USA.

Laroche, Isabelle et al., "An Efficient VLSI Architecture of a Layered Space-Time Receiver," *Proc. of the IEEE 65th Vehicular Technology Conference*, Apr. 1, 2007, pp. 387-391, IEEE, Piscataway, New Jersey, USA.

U.S. Appl. No. 12/552,171, filed Sep. 1, 2009, Rao et al.
U.S. Appl. No. 12/552,174, filed Sep. 1, 2009, Raghavendar et al.
U.S. Appl. No. 12/552,178, filed Sep. 1, 2009, Raghavendar et al.
U.S. Appl. No. 12/552,180, filed Sep. 1, 2009, Raghavendar et al.
U.S. Appl. No. 12/623,656, filed Nov. 23, 2009, Tarn et al.

Böhnke, Ronald et al., "Reduced Complexity MMSE Detection for BLAST Architectures," *Proc. of the 2003 IEEE Global Telecommunications Conference*, Dec. 1, 2003, pp. 2258-2262, vol. 4, IEEE, Piscataway, New Jersey, USA.

Edman, Fredrik, *Digital Hardware Aspects of Multiantenna Algorithms*, PhD thesis, 2006, pp. 98, Lund University, Department of Electroscience, Lund, Sweden.

Edman, Fredrik et al., "A Scalable Pipelined Complex Valued Matrix Inversion Architecture," *Proc. of the 2005 IEEE International Symposium on Circuits and Systems*, May 23, 2005, vol. 5, IEEE, Piscataway, New Jersey, USA.

El-Amawy, A. et al., "Parallel VLSI algorithm for stable inversion of dense matrices," *IEE Proceedings-E Computer and Digital Techniques*, Nov. 1989, pp. 575-580, vol. 136, Issue 6, IEEE, Piscataway, New Jersey, USA.

Gentleman, W. M. et al., "Matrix triangularization by systolic arrays," *Proc. SPIE Symposium on Real-Time Signal Processing IV*, Aug. 1981, pp. 19-26, vol. 298.

Haller, B. et al., "Efficient Implementation of Rotation Operations for High Performance QRD-RLS Filtering," *Proc. of the 1997 IEEE International Conference on Application-Specific Systems, Architectures and Processors*, Jul. 14, 1997, pp. 162-174, IEEE, Piscataway, New Jersey, USA.

Hassibi, Babak, "An Efficient Square-Root Algorithm for BLAST," *Proc. of the 2000 IEEE International Conference on Acoustics, Speech and Signal Processing*, Jun. 5, 2000, pp. 737-740, vol. 2, IEEE, Piscataway, New Jersey, USA.

Haykin, Simon, *Adaptive Filter Theory*, 2002, pp. 838-841, Appendix F, Prentice Hall, Upper Saddle River, New Jersey, USA.

Hemkumar, Nariankadu, "Efficient Complex Matrix Transformations with CORDIC," *Proc. of the 1993 IEEE 11th Symposium on Computer Arithmetic*, Jun. 29, 1993, pp. 122-129, IEEE, Piscataway, New Jersey, USA.

Hemkumar, Nariankadu D., *A Systolic VLSI Architecture for Complex SVD*, MS Thesis, May 1991, pp. 1-122, Rice University, Department of Electrical and Computer Engineering, Houston, Texas.

Karkooti, Marjan et al., "FPGA Implementation of Matrix Inversion Using QRD-RLS Algorithm," *Conference Record of the 39th Asilomar Conference on Signals, Systems and Computers*, Oct. 28, 2005, pp. 1625-1629, IEEE, Piscataway, New Jersey, USA.

Kim, Hun Seok et al., "A Practical, Hardware Friendly MMSE Detector for MIMO-OFDM-Based Systems," *EURASIP Journal on Advances in Signal Processing*, 2008, pp. 1-14, vol. 2008, Hindawi Publishing Corp., New York, New York, USA.

Sayed, Ali, *Fundamentals of Adaptive Filtering*, 2003, pp. 804-807, Section 12.A.1, John Wiley & Sons, Inc., Hoboken, New Jersey, USA.

U.S. Appl. No. 12/814,319, filed Jun. 11, 2010, Rao et al.

* cited by examiner

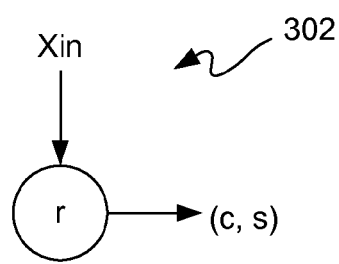 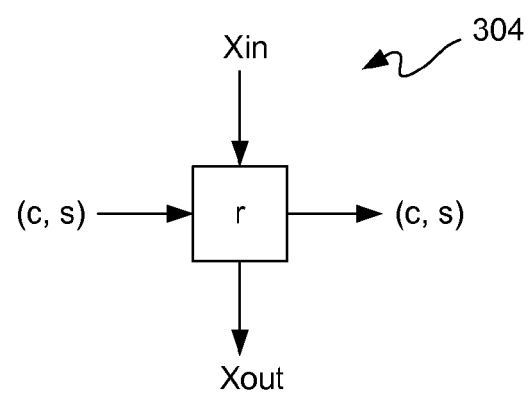
FIG. 3-1　　　　　　　　　FIG. 3-2

MULTIPLE-INPUT MULTIPLE-OUTPUT (MIMO) DECODING WITH SUBCARRIER GROUPING

FIELD OF THE INVENTION

The present invention generally relates to communication to multiple input antennas from multiple output (MIMO) antennas.

BACKGROUND

Data can be transmitted electromagnetically between a transmitting and a receiving antenna. The transmitter encodes the data into a sequence of symbols selected from a symbol constellation. The transmitting antenna transmits the symbols and the receiving antenna detects the symbols.

Interference from noise and reflections may corrupt the symbols received by the receiving antenna. For a maximum-likelihood detector, the receiver can compare the received signal with the expected received signal for all of the symbols in the constellation. The expected received signal that most closely matches the actual received signal provides the detected symbol.

A measurement of the characteristics of the communication medium helps proper symbol detection. In one example, the transmitter periodically transmits a known pattern of symbols to the receiver and the receiver uses the known pattern to determine the characteristics, such as multiple signal propagation paths, of the communication medium.

The data transfer rate of electromagnetic communication is increased by transmitting multiple symbols in parallel from multiple transmitting antennas. The detection of the multiple transmitted symbols improves by receiving the symbols with multiple receiving antennas. For maximum-likelihood detection with multiple transmitting antennas, the number of possible combinations of symbols transmitted in parallel is the degree of the constellation raised to the power of the number of transmitting antennas. Evaluation of all possible combinations is infeasible for higher order modulation and a large number of antennas.

The present invention may address one or more of the above issues.

SUMMARY

In one embodiment of the present invention a MIMO receiver circuit is provided. The MIMO receiver includes input circuitry, configured to provide a matrix of unresolved symbols from radio frequency signals received from a plurality of receive antennas, and channel estimation circuitry coupled to the input circuitry. The channel estimation circuitry is configured to construct a plurality of channel matrices, each from a set of channel transfer elements corresponding to a distinct subcarrier of a wireless channel.

The receiver circuit additionally includes a preprocessing circuit connected to receive the plurality of channel matrices as input. The preprocessing circuit is configured to receive input from the plurality of channel matrices and interleave retrieved input from the plurality of channel matrices into an input matrix.

The receiver circuit further includes a first systolic array. The first systolic array includes boundary cells and internal cells. The preprocessing circuit is coupled to one of the boundary cells and a subset of the internal cells. The boundary cells and internal cells are configured to perform triangulation and back-substitution on the input matrix to produce an output matrix.

The receiver circuit further includes a second systolic array connected to receive the output matrix of the first systolic array. The second systolic array is configured to perform right and left multiplication operations and cross-diagonal transpose on the output matrix to produce a weighted matrix.

The receiver circuit further includes an output circuit connected to the second systolic array and configured to multiply the weighted matrix by the matrix of unresolved symbols from the input circuitry to produce an estimate of isolated symbols corresponding to the unresolved symbols.

In another embodiment of the invention, a computer-implemented method of decoding MIMO signals is provided. A first and a second matrix of inputs from a MIMO receiver are stored. Elements of the first matrix set are grouped with elements of the second matrix set which correspond to the same row and column as the elements of the first matrix set. The grouped inputs are input into a first systolic array. The grouped inputs are triangularized by a computer using the first systolic array to produce a third matrix. An inversion of the third matrix is performed to produce a fourth matrix. Left multiplication is performed on the fourth matrix to produce a fifth matrix. Cross-diagonal transpose is performed on the fifth matrix to produce a sixth matrix. Right multiplication is performed on the sixth matrix to produce a seventh matrix. The seventh matrix is multiplied with a selection vector to produce decoded MIMO signals, which are then output.

In yet another embodiment of the invention, a MIMO decoder is provided. The MIMO decoder includes an input circuit for receiving a plurality of channel matrices corresponding to a plurality of subcarriers, which include at least a first channel matrix and a second channel matrix and the first matrix is independent of the second matrix. The MIMO decoder additionally includes a circuit means for interleaving the plurality of channel matrices into an interleaved matrix.

The decoder further includes a systolic array means for triangulating the interleaved matrices to produce a third matrix. The systolic array means is configured to perform an inversion of the third matrix to produce a fourth matrix and perform a left multiplication on the fourth matrix with the interleaved plurality of channel matrices to produce a fifth matrix. The systolic array means is further configured to perform cross diagonal transpose on the fifth matrix with the interleaved plurality of channel matrices to produce a sixth matrix, perform right multiplication on the sixth matrix to produce a seven matrix, and multiply the sixth matrix with a selection vector.

It will be appreciated that various other embodiments are set forth in the Detailed Description and Claims which follow.

BRIEF DESCRIPTION OF THE DRAWINGS

Various aspects and advantages of the invention will become apparent upon review of the following detailed description and upon reference to the drawings, in which:

FIGS. 3-1 shows a boundary cell of a systolic array for performing triangularization;

FIGS. 3-2 shows an internal cell of a systolic array for performing triangularization;

DETAILED DESCRIPTION

In multiple input multiple output (MIMO) systems multiple (M) transmitting antennas transmit respective symbols in parallel to multiple (N) receiving antennas. Each of the receiving antennas receives a weighted sum of the respective symbols transmitted from the transmitting antennas. Various algorithms exist to decode or separate the symbols transmitted by each transmitting antenna. In the decoding calculation, a systolic array can be used to increase streaming throughput. A systolic array is an interconnected matrix of individual signal processing units, or "cells," where the cells process individual elements of an input matrix and exchange processed output to perform an overall operation. However, in the context of MIMO decoding using present algorithms, systolic arrays are subject to a dependency between sequentially streamed inputs—the processing of one element is dependent on the calculated value of the previously processed element. Thus, an input element cannot be processed until the processing of the preceding element is completed. The present invention improves throughput in a systolic array-implemented MIMO decoder by grouping input elements of non-dependent matrices such that non-dependent elements are processed in between dependent elements of an input matrix. In this manner, input elements can be input and processed by a processing cell before processing of the preceding element has completed.

Figure 1:
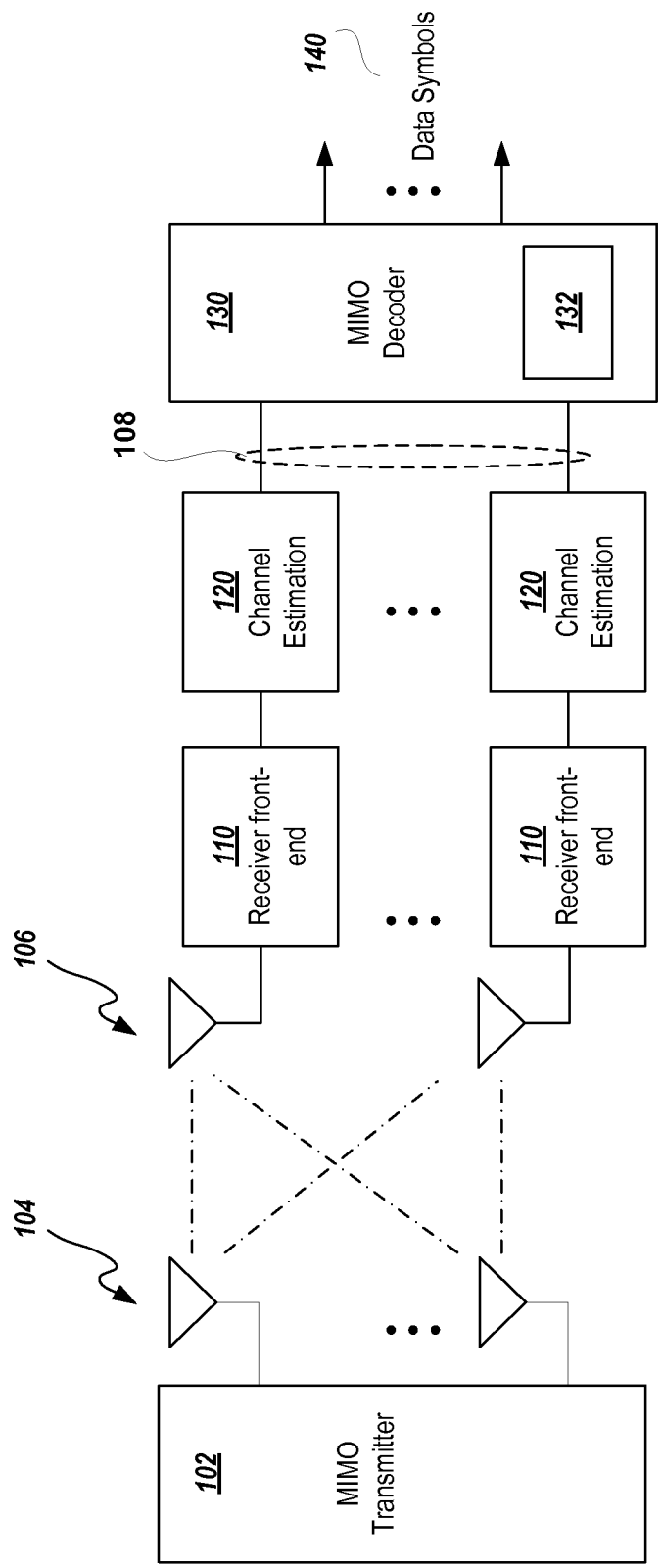
FIG. 1 is a block diagram depicting an exemplary embodiment of a MIMO communication system.

FIG. 1 is a block diagram depicting an exemplary embodiment of a MIMO communication system. MIMO transmitter 102 has multiple antennas 104, each of which transmits a different set of symbols in parallel. Antennas 106 receive signals respectively for receiver front-ends 110. Outputs of receiver front-ends 110 are respectively provided to channel estimation circuits 120. Outputs 108 from channel estimation circuits 120 are provided to MIMO decoder 130. MIMO decoder 130 includes complex Givens rotation block 132. MIMO decoder 130 outputs decoded data symbols 140.

A model for the communication channel between the M transmitting antennas and the N receiving antennas is:

$$y = Hx + n$$

where H is an N×M channel matrix between the N receiving antennas and the M transmitting antennas, x is a column vector of M symbols transmitted from the transmitting antennas, n is a column vector of N received noise elements, and y is a column vector of N signals received at the receiving antennas. Each of the M transmitted symbols in column vector x is a symbol from a constellation having an order of w symbols.

An estimate $\hat{x}$ of the transmitted symbols can be computed by finding a weight matrix W that can multiply the received signal vector y. The weight matrix W can be computed using the minimum mean square error (MMSE) of inverse of H. The MMSE solution is given by, $$W = (H^H H + \sigma^2 I_{nT})^{-1} H^H$$

The MMSE solution above requires the generation of the $H^H H$ matrix. In various solutions the $H^H H$ multiplication can be avoided by using an extended channel matrix defined as, $$\underline{H} = \begin{bmatrix} H_{nR \times nT} \\ \sigma I_{nT} \end{bmatrix} \text{ and } \underline{y} = \begin{bmatrix} y_{nR \times 1} \\ 0_{nT} \end{bmatrix}$$

The estimate $\hat{x}$ is defined in terms of the extended channel matrix as, $$\hat{x} = W \underline{y} (\underline{H}^H \underline{H})^{-1} \underline{H}^H \underline{y} = \underline{H}^\dagger \underline{y}$$

Both solutions require a matrix inverse of the H matrix. This is accomplished through QR decomposition as follows, $$H = QR$$

$$H^\dagger = R^{-1} Q^H$$

In the case of the extended channel matrix solution the QR decomposition of the extended matrix can be expressed as, $$\underline{H} = \begin{bmatrix} H \\ \sigma I_{nT} \end{bmatrix} = \underline{Q}_{(nT+nR) \times (nT+nR)} R_{(nT+nR) \times nT} = \begin{bmatrix} Q_{1(nR \times (nT+nR))} \\ Q_{2(nT \times (nT+nR))} \end{bmatrix} \underline{R}$$

By equating the lower block the following solution is obtained, $$\sigma I_{nT} = Q_2 \underline{R} \Rightarrow \underline{R}^{-1} = \frac{1}{\sigma} Q_2$$

With this solution the estimate $\hat{x}$ can be expressed as, $$\hat{x} = \underline{H}^\dagger \underline{y} = \underline{R}^{-1} [Q_1^H \quad Q_2^H] \underline{y} = \frac{1}{\sigma} Q_2 Q_1^H y = \underline{R}^{-1} Q_1^H y$$

where, $$W = \underline{R}^{-1} Q_1^H$$

$Q_1$ can be calculated by equating the upper block matrix as, $$H = Q_1 \underline{R} \Longrightarrow Q_1 = H \underline{R}^{-1}$$

The calculation of the weight matrix through MMSE QR decomposition can be implemented using one or more systolic arrays. A systolic array is an interconnected matrix of individual signal processing units or cells, where overall operation of the systolic array depends upon functions of the individual signal processing cells and the interconnection scheme of such signal processing cells. A clock signal may be applied to a systolic array to control data flow through each cell. Alternately, operations of an individual cell may be triggered by the arrival of input data objects.

The interconnection scheme of some systolic arrays may include interconnects only between nearest neighbor signal processing cells within a systolic array. However, interconnection schemes are not limited to having only nearest neighbor interconnects.

In matrix processing operations, matrix elements are passed between cells according to element relationship and the function to be performed. For example, matrix multiplication is performed by inputting one row of the matrix at a time from the top of the array, which is passed down the array. The other matrix is input one column at a time from the left hand side of the array and passes from left to right. When each cell has processed one whole row and one whole column, the result of the multiplication is stored in the array and can now be output a row or a column at a time, flowing across or down the array.

The systolic array implementation of the MMSE calculation is advantageous because it is easily scalable as the number of antenna channels used increases. To calculate MMSE in a systolic array, the extended channel matrix H is decomposed into a triangular matrix R. The triangularized matrix R is inverted using back-substitution within the systolic array to generate $R^{-1}$. The $Q_1$ matrix is then generated by left multiplication of the original channel matrix H with $R^{-1}$. $Q_1'$, the hermitian matrix of $Q_1$ is generated by some special circuitry and wiring between output and input of the systolic array. The weight matrix W is then generated by right multiplying $Q_1'$ with $R^{-1}$. An estimate $\hat{x}$ is then computed by multiplying weight matrix W with received signal vector y.

The systolic array cells may be configured to operate in different modes to perform each function of the MMSE calculation. As such, some systolic array configurations will implement all functions of the MMSE calculation within a single systolic array with a different mode for each function to be performed. Alternately, the various functions of the MMSE calculation may be performed by separate systolic arrays, where the output matrix of one array is passed as input to the next.

Figure 2:
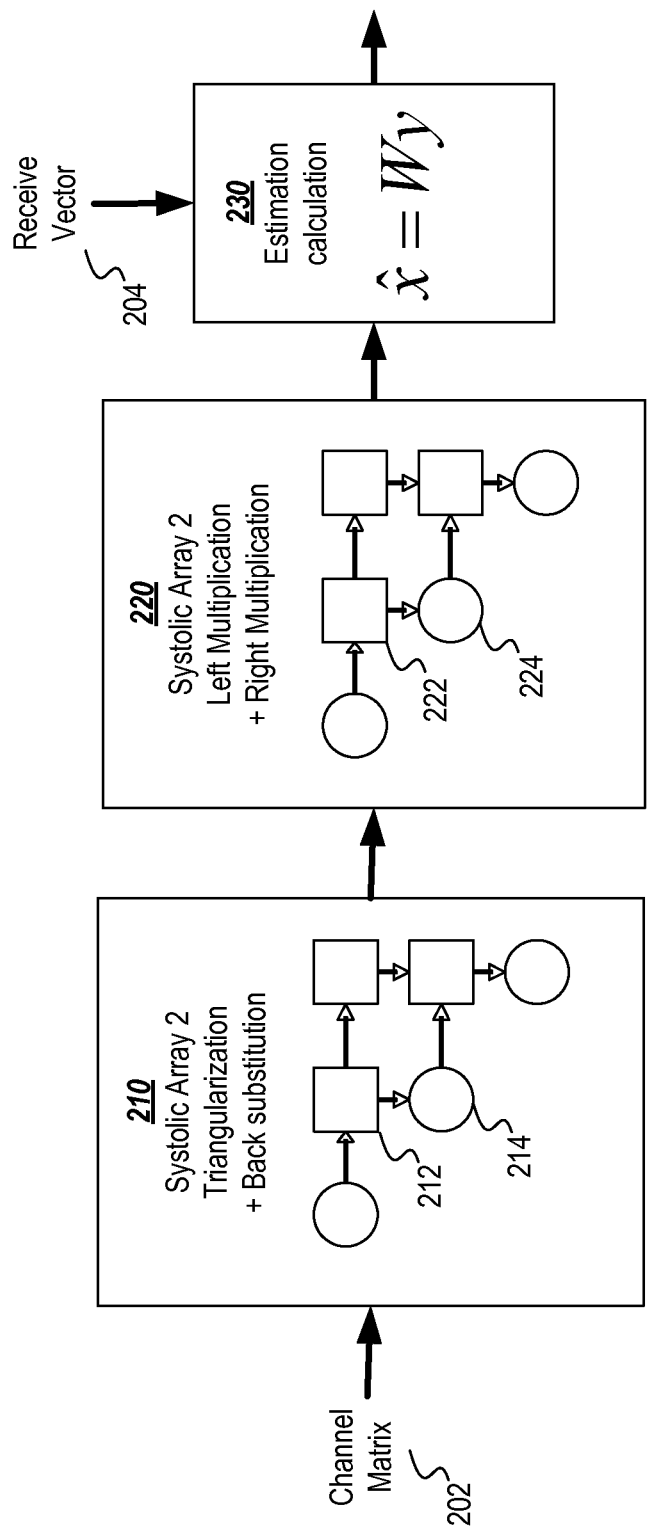
FIG. 2 shows a block diagram of two systolic arrays configured to perform MMSE calculations.

FIG. 2 shows a block diagram of two systolic arrays configured to perform the MMSE calculation. In this example implementation, the processes of the calculation are split between two systolic arrays. A first systolic array 210 is configured to receive channel matrix 202 and perform triangularization and back substitution. The output of systolic array 210 is provided to a second systolic array 220, which is configured to perform right and left multiplication operations. The output of systolic array 220 is multiplied by receive vector 204 in channel estimator 230 to produce an estimation of the received channels. The systolic arrays 210 and 220 include respective boundary cells 214 and 224 and internal cells 212 and 222. Implementation of the boundary cells is different from the internal cells. Boundary cells are configured to calculate initial values that are passed on to and/or updated by the internal cells. For example, in triangularization, the boundary cells are configured to calculate rotation factors which are passed through and applied by the internal cells.

Systolic arrays are advantageous in that they are fast and scale easily as the number of MIMO antennas in increased. However, systolic arrays are subject to an inherent latency due to dependency between sequential matrix elements in several of the functions of the MMSE calculation. For example, in performing triangularization of the extended channel matrix, a matrix element in a processing cell is dependent on the calculated value of the preceding element of the matrix. Thus, each element of a matrix column or row cannot be processed until the processing of the preceding element is completed.

FIGS. 3-1 and 3-2 show block diagrams of cells for performing triangularization in a systolic array. FIG. 3-1 shows a boundary cell for performing triangularization. Boundary cell 302 computes rotation factors c and s which are passed on to the neighboring internal cell. The rotation factors are initially c=1 and s=0 which are then computed based on input received and an accumulated value from previous c and s calculations. The c and s calculation is given by, $$r_{new} = \sqrt{r_{old}^2 + x^2}$$

$$c = \frac{r_{old}}{r_{new}} \quad s = \frac{x}{r_{new}}$$

Rotation factors are calculated and updated as each element of the matrix is input to and processed by each cell. In calculating rotation factors c and s, the value of $r_{new}$ is dependent on the value of $r_{old}$ which is calculated from previously processed elements of the channel matrix.

FIGS. 3-2 shows an internal cell for performing triangularization. Internal cell 304 consists of two multipliers at the input of an accumulator followed by shift register (not shown). Internal cell 304 applies rotations c and s computed in the preceding cell to the other columns of the input matrix. The inputs c and s receive the rotation factors from the boundary cell or from a preceding internal cell. These rotation factors are applied to the input element x and are passed along to the neighboring internal cells. Output x is calculated with c and s rotation factors and an accumulated value from calculations of previous input. The c and s rotation factors are then passed to the next internal cell in the array. The calculation of output x is given by, $$X_{out} = -s \cdot r + c \cdot X_{in}$$

$$r(new) = c^* \cdot r + s^* \cdot X_{in}$$

In calculating the value of $X_{out}$, the value of $r_{new}$ is dependent on the value of $r_{old}$ which is calculated from previously processed elements of the channel matrix.

Because the operations performed by the internal and boundary cells are dependent on the accumulated values determined from previous input values, an element of a channel matrix cannot be input until the elements upon which it is dependant have been processed. For example, in hardware, the complex multiplication performed by the internal cell takes at least four clock cycles. In previous implementations of systolic arrays, input to the systolic array is halted until the updated c and s values are calculated—creating a bottleneck of the algorithm and lengthening the streaming latency.

The present invention improves throughput of the systolic array by processing non-dependent input from different channel matrices elements in between processing of dependent channel matrix elements. In this manner, an element can be input and processed by a processing cell before processing of the preceding element has completed.

The systolic array of FIG. 2 and processing cell implementation of FIGS. 3-1 and 3-2 are described for exemplary purposes. It is understood that the present invention is applicable to other systolic arrays implementing the MMSE as well as other estimation algorithms with inherent dependency between sequential input elements such as zero-forcing or other linear MIMO decoding algorithms. The dependency is broken by grouping elements of several channel matrices corresponding to several sub-carriers. Sub-carriers are utilized in several MIMO systems. For example, the 3GPP-LTE system uses carrier bands of 20 MHz which is split into 100 resource blocks of 180 kHz. Each resource block contains 12 subcarriers with a spacing in the frequency domain of 15 kHz. The embodiments of the present invention place symbols received from each subcarrier into a separate channel matrix and groups elements of the sub-carrier matrices that are of the same row and column index. The sub-carrier grouping minimizes the overall streaming latency of the processing cells.

The subcarriers enter the MIMO decoder system serially, in a time division multiplexed fashion. Therefore, the non-dependant data from the sub-carriers can be formed into a group to shorten the streaming latency and increase the system throughput. For example, in a system where two subcarriers, A and B, are used in a 2×2 MIMO system, inputs streamed into the sytollic array would be $H_{A11}$, $H_{B11}$, $H_{A12}$, $H_{B12}$, corresponding to the first row of the channel matrix, and $H_{A21}$, $H_{B21}$, $H_{A22}$, $H_{B22}$, corresponding to the second row of the channel matrix. In this example $H_{A12}$ is the channel matrix element of subcarrier A at row index 1 and column index 2 and $H_{B12}$ is the channel matrix of subcarrier B at row index 1 and column index 2.

As the grouped or interleaved input is streamed through the systolic array, each processing cell must store dependency variables until the next dependent element is input. In the two subcarrier example above, rotation factors calculated from $H_{A11}$ must be stored until dependent element $H_{A12}$ is received as input. One method of storage of the rotation factors of each subcarrier is the use of shift registers. Using the boundary cell of FIGS. 3-1 as an example, the boundary cells consist of a magnitude squared ($|x|^2$) module, followed by an accumulator and a shift register. The shift register must be deep enough to process and store a variable for each of the subcarriers. In the optimal situation the number of subcarriers is chosen to be greater than the length of the processing delay of the processing cell with the longest delay. In this manner, internal processing stages of each cell are simultaneously utilized. As discussed above, the complex multiplication of the internal cell of FIGS. 3-2 takes four clock cycles, so in 3GPP-LTE, grouping of 12 sub-carriers is an optimal grouping.

For illustration purposes, the following examples show the operation of a systolic array with grouping of two subcarriers. It is understood that any number of subcarriers may be used in accordance with various embodiments of the invention.

Figure 4:
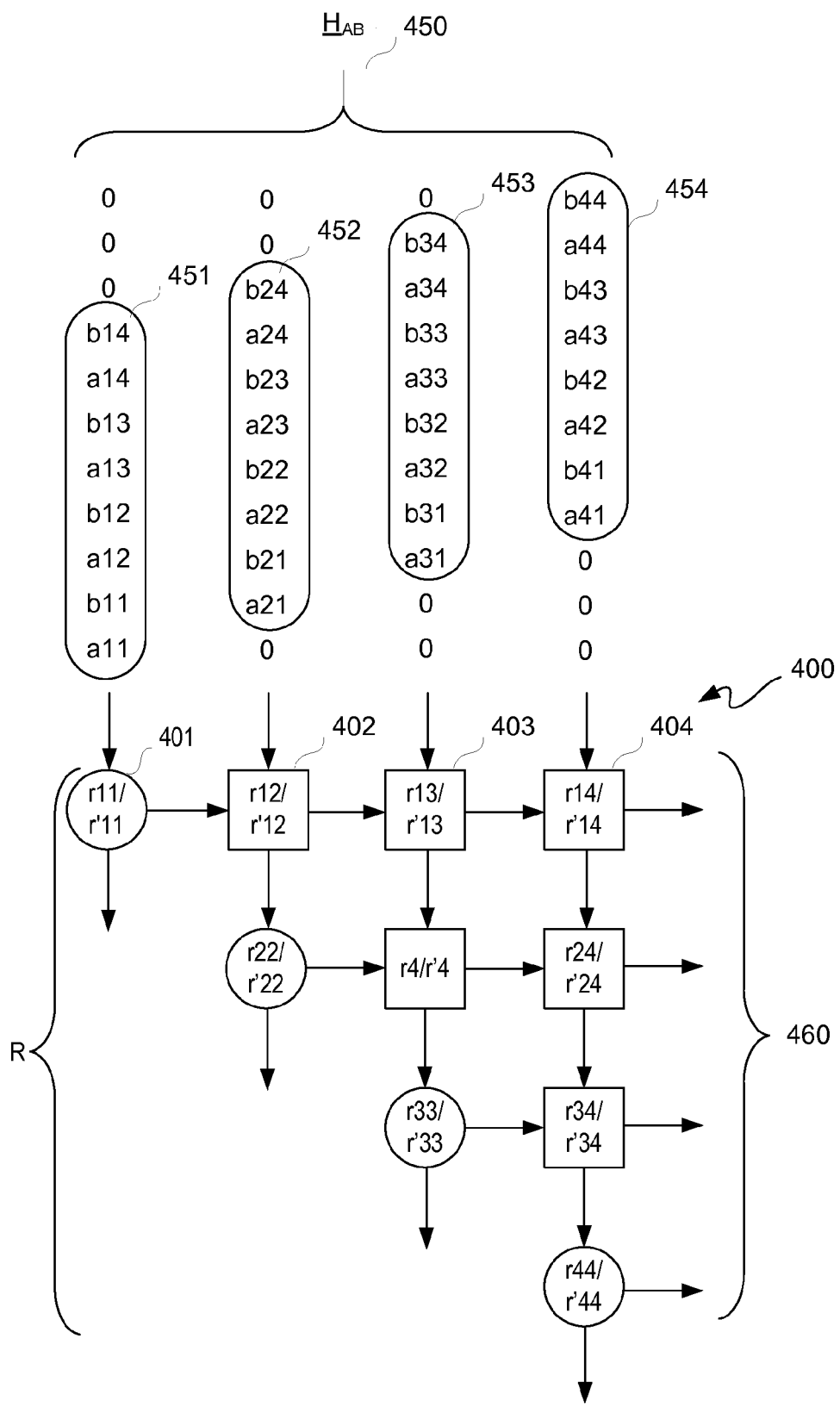
FIG. 4 shows an example systolic array configured to perform triangularization with grouped subcarrier input.

FIG. 4 shows an example systolic array configured to perform triangularization with grouped subcarrier input. Extended channel matrix $H_{AB}$ 450 shows how subcarriers are grouped as input to systolic array 400. Some embodiments of the invention refer to grouped matrices as interleaved and such terms are used interchangeably herein. Grouped extended channel matrix $H_{AB}$ contains four rows 451, 452, 453, and 454 oriented in a vertical direction for input. Grouped extended channel matrix $H_{AB}$ is serially input into the systolic array, in that elements of subcarrier A and B in a row are received by the same systolic array input and are processed by the same cells. Because variables used in the calculation are maintained in separate registers for each channel matrix, serially processed elements of subcarrier A and B can be processed independently by the same processing cells without interfering with the R calculation of the other.

A first row 451 of matrix $H_{AB}$ is clocked into an upper leftmost boundary cell 401. A second row 452 of matrix $H_{AB}$ is clocked into internal cell 402, and a third row 453 of matrix $H_{AB}$ is clocked into internal cell 403. Lastly, for the depicted example embodiment, a fourth row 454 of matrix $H_{AB}$ is clocked into internal cell 404. Each row has elements of subcarriers A and B grouped according to column indices, with elements of subcarrier A at row i and column j denoted as $a_{ij}$ and elements of subcarrier B at row i column j denoted as $b_{ij}$.

Due to clock delays, zero padding is used for the calculations to be performed directly. Accordingly, a first input row 401 for input of matrix $H_{AB}$ is H1, 0, 0, 0 as respectively input to cells 401 through 404. Furthermore, a second input row 402 for input of matrix $H_{AB}$ includes values 0, H2, 0, 0, respectively input to cells 401 through 404. A third input row 403 for input of matrix $H_{AB}$ is 0, 0, H3, 0 as respectively input to cells 401 through 404. A fourth input row 404 for input of matrix $H_{AB}$ does not include any zero padding in the depicted exemplary embodiment; however, input rows after row 404 do include zero padding in the depicted exemplary embodiment. Accordingly, rows 451 through 454 of matrix $H_{AB}$ may be input as staggered with zero padding for multiplication As $H_{AB}$ is input, triangularization is performed, leaving each cell with trained register values containing matrix R corresponding to channel matrix $H_A$ and R' corresponding to channel matrix $H_B$. On the right side of systolic array 400 output 460 may be obtained.

Subcarrier grouping of input is similarly performed if the systolic array is configured to operate in different modes and perform further operations of the MMSE calculation. For example, if the systolic array is configured to perform back substitution in addition to triangularization, each cell will switch to a back substitution mode following triangularization, and would use the stored R and R' values to perform the inversion operation. After back-substitution each cell would be trained to contain $R^{-1}$ and $R'^{-1}$ values. Interleaved matrix $R_{AB}^{-1}$ would be shifted to outputs 460 on the right side of systolic array 400. Alternately, if the systolic array were configured to operate in yet another mode to perform the left multiplication operation, the trained values, $R^{-1}$ and $R'^{-1}$, would not be shifted to output but would be maintained within each cell to perform the left multiplication operation. In some embodiments, the trained stored values in a systolic array are referred to as residues and such terms are used interchangeably herein.

Figure 5:
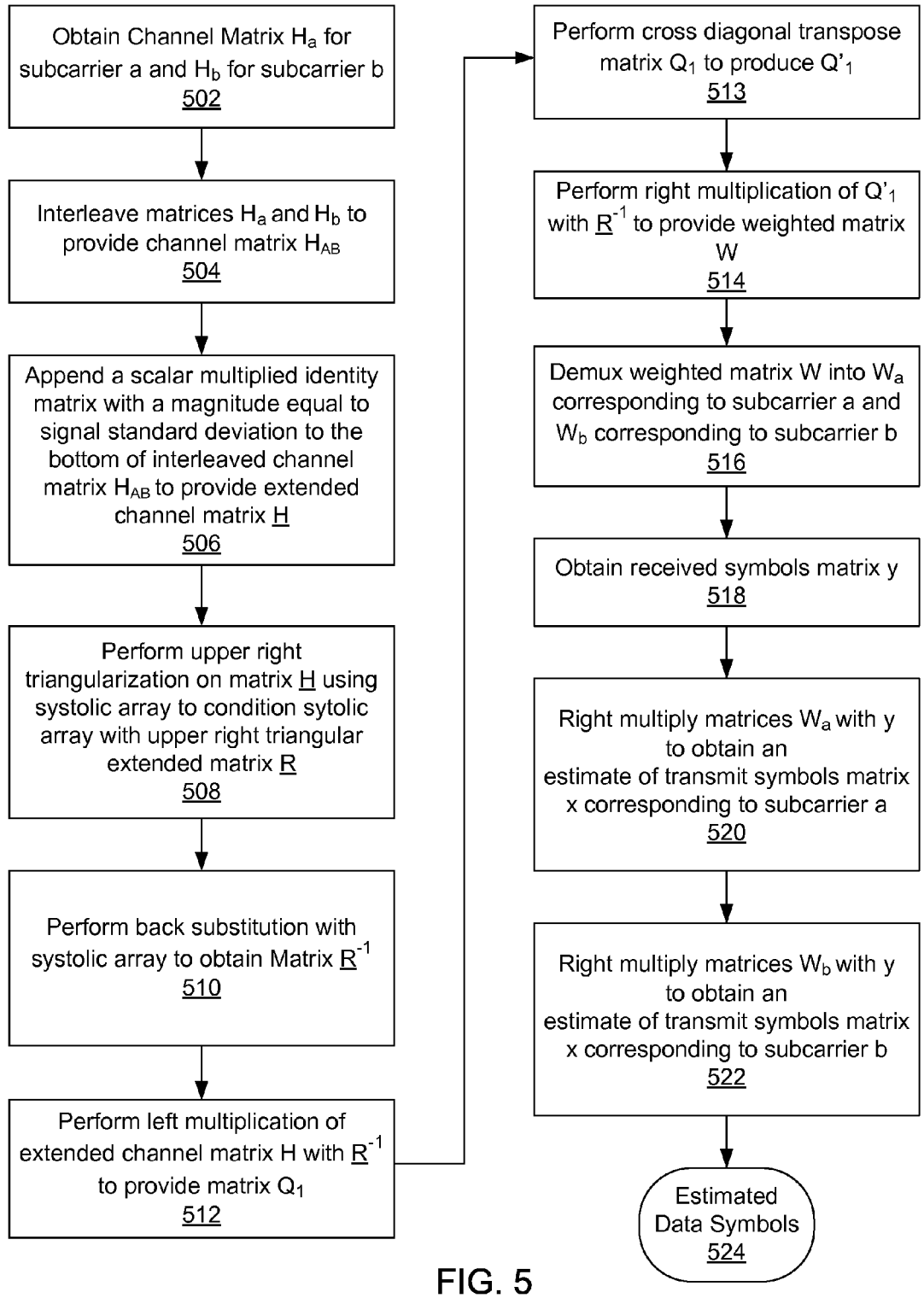
FIG. 5 illustrates a flowchart of a process to decode channel symbols of multiple subcarriers in a MIMO receiver in accordance with several embodiments of the invention.

FIG. 5 illustrates a flowchart of a process to decode channel symbols of multiple subcarriers in a MIMO receiver in accordance with several embodiments of the invention. Channel matrices $H_A$, corresponding to subcarrier A, and $H_B$, corresponding to subcarrier B, are received at step 502. Matrices $H_A$ and $H_B$ are interleaved to produce channel matrix $H_{AB}$ at step 504. A scalar-multiplied identity matrix with a magnitude determinant equal to signal standard deviation is appended to the bottom of matrix $H_{AB}$ at step 506 to produce extended channel matrix H.

Alternately, matrices $\overline{H}_A$ and $H_B$ may be separately processed at step 506 to produce extended channel matrices $H_A$ and $H_B$, which are then interleaved to produce extended channel matrix H.

Upper right triangularization is performed on the extended channel matrix H at step 508 using a systolic array, which conditions the systolic array with triangularized matrix R. Back substitution is performed on R at step 510 to obtain inverted matrix $R^{-1}$. Left multiplication of extended channel matrix H with $R^{-1}$ is performed at step 512 to provide matrix $Q_1$. Cross diagonal transpose is performed on matrix $Q_1$ at step 513 to produce $Q'_1$. Right multiplication of $Q'_1$ with $R^{-1}$ is then performed to provide weighted matrix W at step 514.

Weighted matrix W is demultiplexed at step 516 into $W_A$ corresponding to subcarrier A and $W_B$ corresponding to subcarrier B. Received symbols matrix y is obtained at step 518 and right multiplied with matrix $W_A$ to obtain an estimate of transmit symbols matrix $X_A$ corresponding to subcarrier A at step 520, and right multiplied with matrix $W_B$ to obtain an estimate of transmit symbols matrix $X_B$ corresponding to subcarrier B at step 522. Estimated data symbols 524 are output from $X_A$ and $X_B$.

Figure 6:
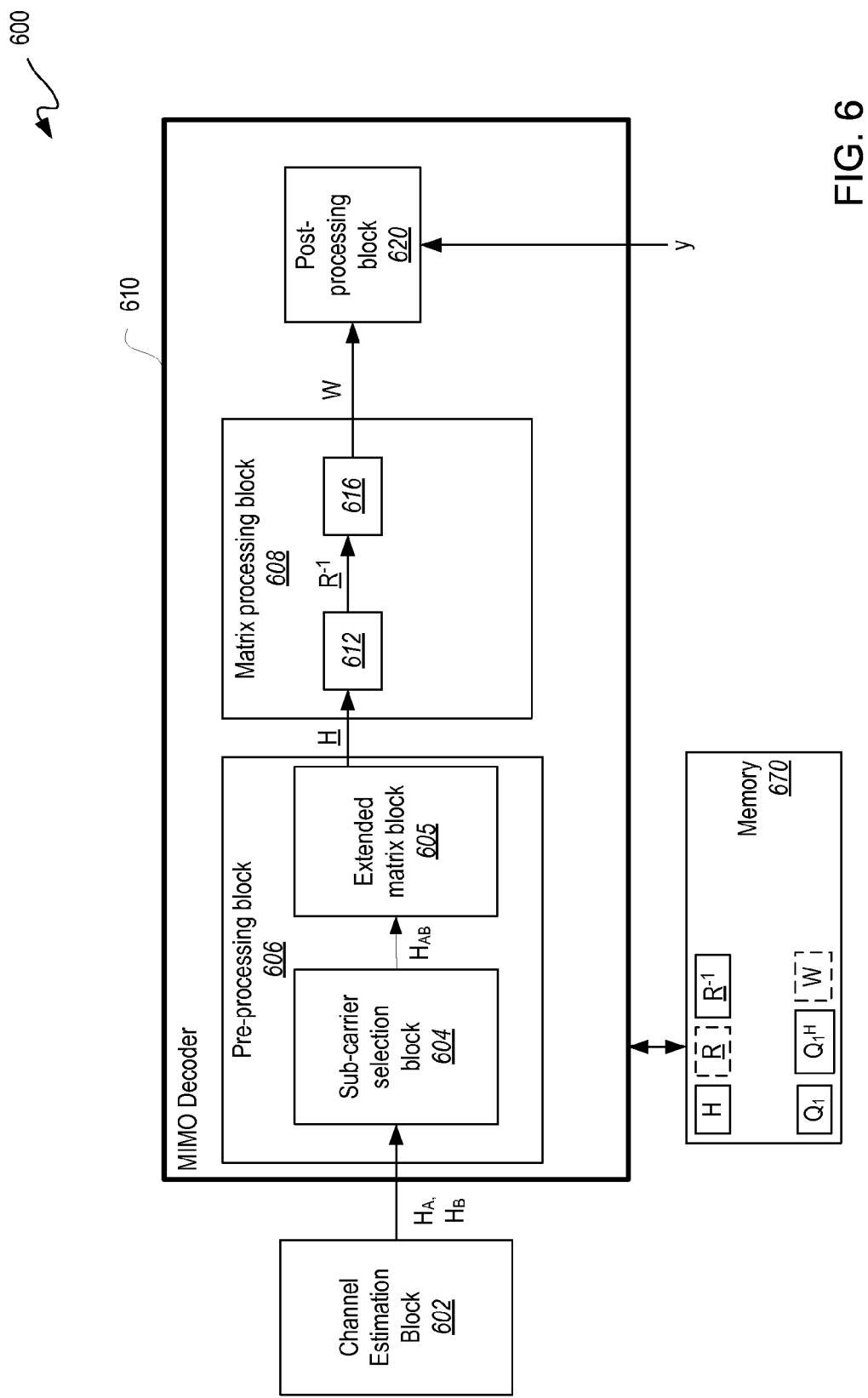
FIG. 6 shows a block diagram of a MIMO receiver configured to perform subcarrier grouping.

FIG. 6 is a block diagram of a MIMO receiver 600 including channel estimation block 602 and MIMO decoder 610. Channel estimation block 602 provides channel coefficients of each subcarrier, which may be organized in the form of a channel matrix H, to MIMO decoder 610. MIMO decoder 610 includes a preprocessing block 606, a matrix processing block 608, and post processing block 620. A memory unit 670 is coupled to MIMO decoder 610 and is used to store intermediate matrices produced during the decoding process. In this example implementation, pre-processing block 606 includes subcarrier selection block 604 and extended matrix block 605. The subcarrier selection block 604 groups subcarrier channel coefficients into an interleaved channel matrix $H_{AB}$. Matrix $H_{AB}$ is received by extended matrix block 606 which appends a scalar multiplied identity matrix with a magnitude determinant equal to signal standard deviation to the bottom of interleaved channel matrix $H_{AB}$ to provide an extended channel matrix H containing both subcarriers.

Matrix processing block performs the MMSE operation on the extended channel matrix to produce weighted matrix W. Matrix processing block 608 contains two systolic array blocks 612 and 616. Systolic array block 612 is configured to receive extended channel matrix H, perform triangularization, and back-substitution to produce matrix $R^{-1}$. Systolic array block 616 is configured to receive $R^{-1}$ and perform right and left multiplication with the original channel matrix $H_{AB}$ to produce the weighted matrix W. The post processing block demultiplexes the weighted matrix W into separate subcarriers and multiplies each by a symbol selection vector y to output an estimated symbol matrix X for each subcarrier.

Figure 7:
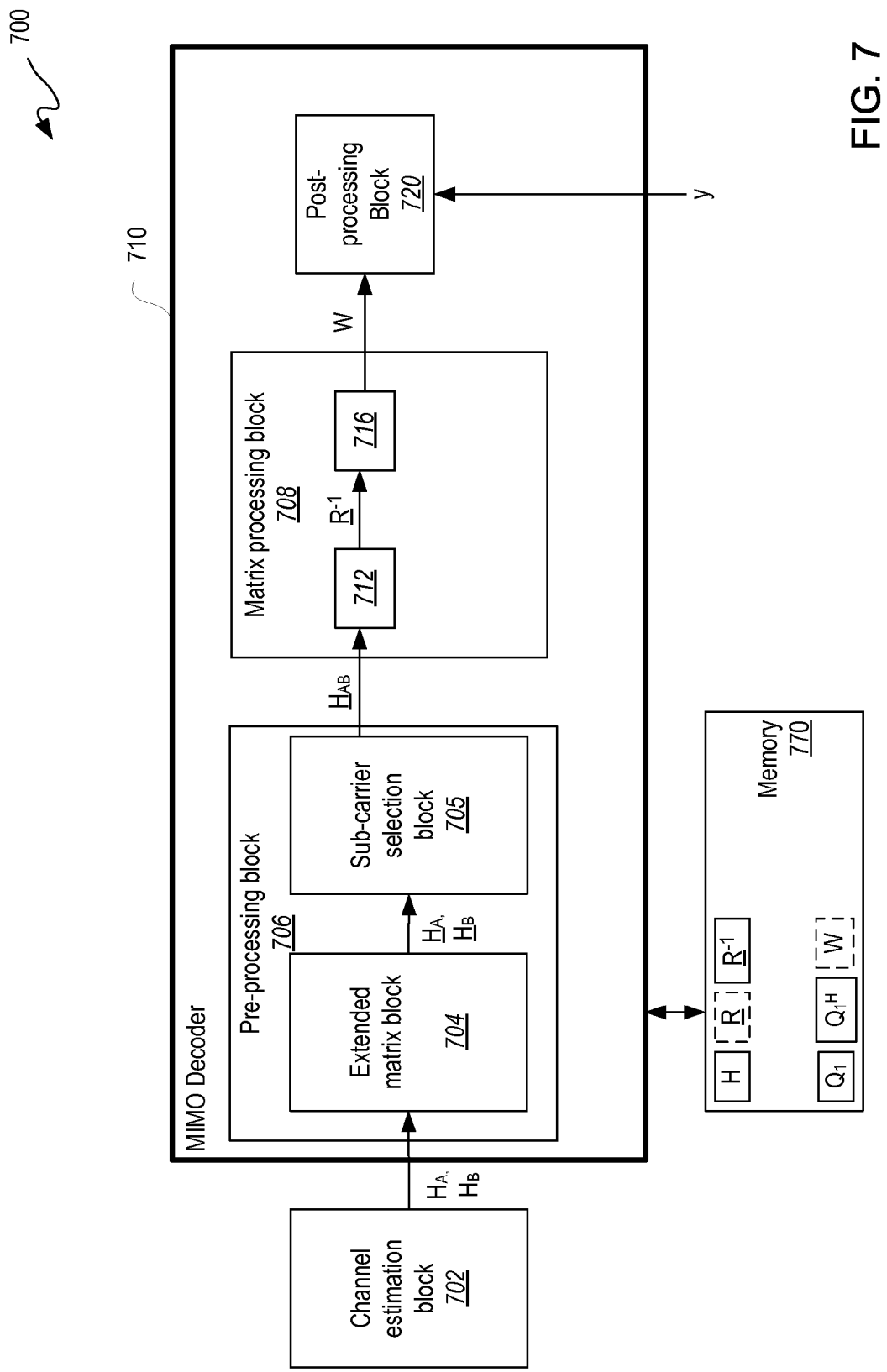
FIG. 7 shows a block diagram of a second example MIMO receiver configured to perform subcarrier grouping.

FIG. 7 shows a block diagram of a second example MIMO receiver 700 including a channel estimation block 702 and a MIMO decoder 710. Like the receiver shown in FIG. 6, channel estimation block 702 provides channel coefficients of each subcarrier to MIMO decoder 710, which may be organized in the form of a channel matrix H. MIMO decoder 710 includes a preprocessing block 706, a matrix processing block 708, and post processing block 720. A memory unit 770 is coupled to MIMO decoder 710 and is used to store intermediate matrices produced during the decoding process.

MIMO decoder 710 is different from that shown in FIG. 6 in that the channel matrix input to the decoder is constructed differently by the pre-processing block. In this example, extended matrix block 704 calculates the extended channel matrix for each subcarrier separately to produce $H_A$ and $H_B$. Subcarrier selection block 705 interleaves $H_A$ and $H_B$ to provide input matrix $H_{AB}$ to matrix processing block 708. Subcarrier selection block may calculate $H_{AB}$ and store the matrix in memory or may interleave $H_A$ and $H_B$ as they are streamed into the matrix processing block. When $H_A$ and $H_B$ are interleaved while streaming, subcarrier selection block 706 may be implemented by a multiplexer configured to cycle through subcarrier inputs in a time division multiplexing fashion. It is understood that subcarrier selection of the preprocessing block may be performed by a single circuit or a plurality of preprocessing circuits corresponding to each input of the systolic array.

Matrix processing block 708 performs the MMSE operation on the interleaved input in a similar manner to the processing block of FIG. 6 to produce weighted matrix W. Matrix processing block 710 contains two systolic array blocks 712 and 716. Systolic array block 712 is configured to perform triangularization, and back-substitution to produce matrix $R^{-1}$. Systolic array block 716 is configured to receive $R^{-1}$, perform right and left multiplication with the original channel matrix $H_{AB}$ to produce the weighted matrix W. The post processing block demultiplexes the weighted matrix W into separate subcarriers and multiplies each by a symbol selection vector y to output an estimated symbol matrix x for each subcarrier.

Figure 8:
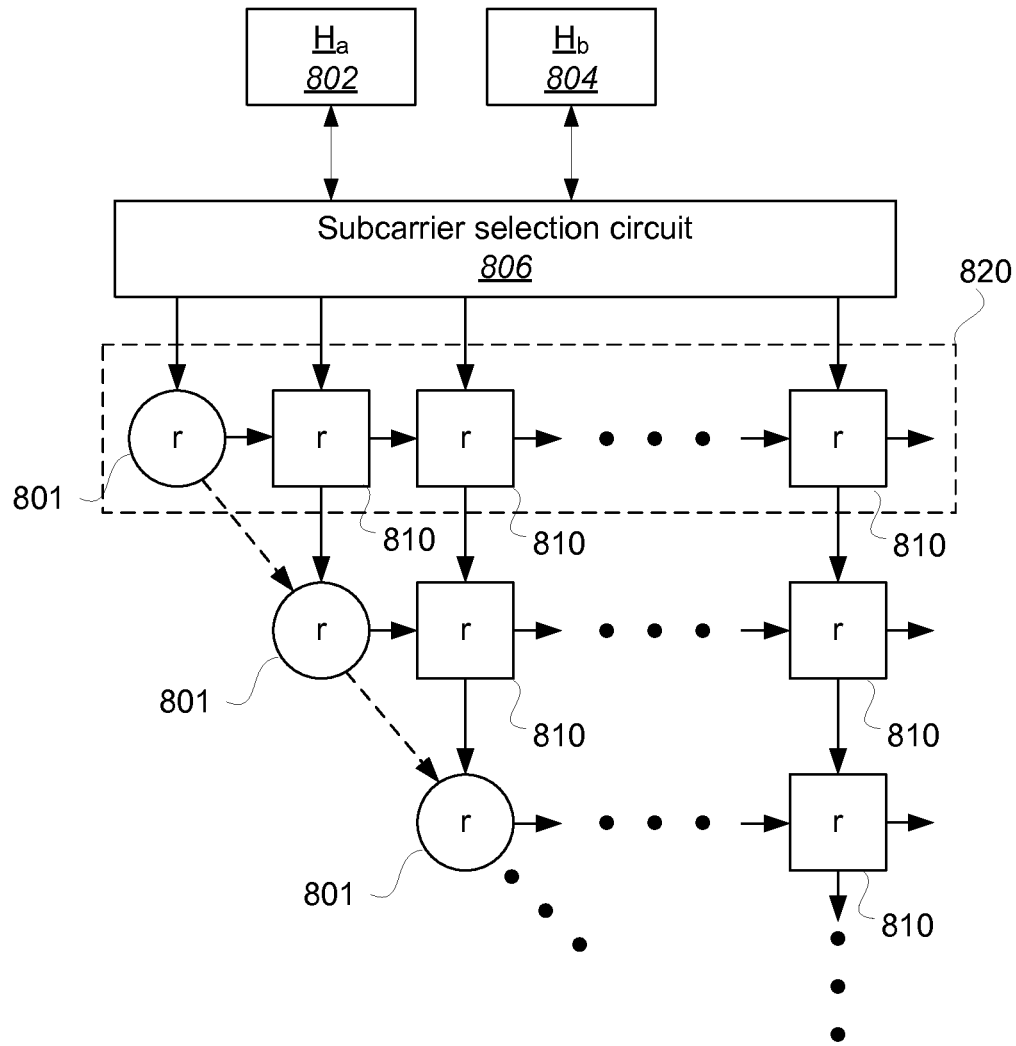
FIG. 8 is a block diagram of a systolic array with subcarrier selection circuit.

FIG. 8 is a block diagram of a subcarrier selection circuit connected to a systolic array. This example illustrates the operation of the channel selection circuit of FIG. 7. Subcarrier selection circuit 806 receives input from extended channel matrices of each subcarrier 802 and 804. Appropriate rows of the extended channel matrices are streamed as input to the input row of a systolic array 820 to a boundary cell 801 and a subset of the internal cells 810. In an alternate configuration, a separate subcarrier selection circuit may be used for each input to the systolic array.

It should be appreciated that the matrix processing blocks shown in FIGS. 6 and 7 may be implemented with a one-by-one systolic array, namely a single boundary cell for multimode systolic array. Moreover, it should be understood that MIMO decoders 608 and 708 may be entirely implemented in a PLD, which may include implementing either or both memory, 670 and 770, and channel estimation block, 602 and 702, in such PLD.

Figure 9:
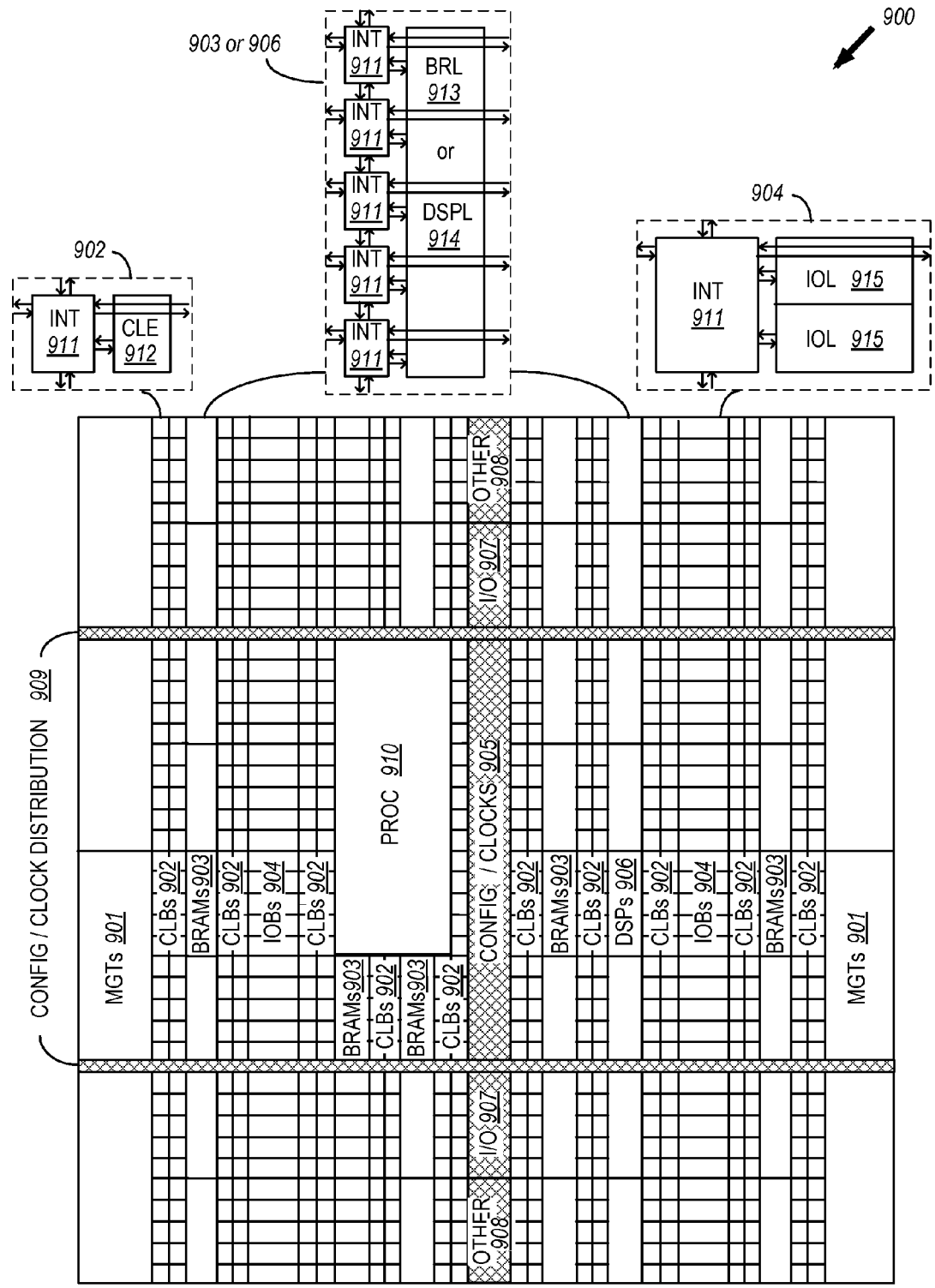
FIG. 9 is a block diagram of a programmable integrated circuit which may be configured to implement a MIMO decoder with subcarrier grouping in accordance several embodiments of the invention.

FIG. 9 is a block diagram of a programmable integrated circuit, specifically an FPGA, which may be configured to implement a MIMO decoder with subcarrier grouping in accordance with one or more embodiments of the invention. FPGAs and other programmable integrated circuits can include several different types of programmable logic blocks in the array. For example, FIG. 9 illustrates an FPGA architecture (900) that includes a large number of different programmable tiles including multi-gigabit transceivers (MGTs 901), configurable logic blocks (CLBs 902), random access memory blocks (BRAMs 903), input/output blocks (IOBs 904), configuration and clocking logic (CONFIG/CLOCKS 905), digital signal processing blocks (DSPs 906), specialized input/output blocks (I/O 907), for example, clock ports, and other programmable logic 908 such as digital clock managers, analog-to-digital converters, system monitoring logic, and so forth. Some FPGAs also include dedicated processor blocks (PROC 910).

In some FPGAs, each programmable tile includes a programmable interconnect element (INT 911) having standardized connections to and from a corresponding interconnect element in each adjacent tile. Therefore, the programmable interconnect elements taken together implement the programmable interconnect structure for the illustrated FPGA. The programmable interconnect element INT 911 also includes the connections to and from the programmable logic element within the same tile, as shown by the examples included at the top of FIG. 9.

For example, a CLB 902 can include a configurable logic element CLE 912 that can be programmed to implement user logic plus a single programmable interconnect element INT 911. A BRAM 903 can include a BRAM logic element (BRL 913) in addition to one or more programmable interconnect elements. Typically, the number of interconnect elements included in a tile depends on the height of the tile. In the pictured embodiment, a BRAM tile has the same height as four CLBs, but other numbers (e.g., five) can also be used. A DSP tile 906 can include a DSP logic element (DSPL 914) in addition to an appropriate number of programmable interconnect elements. An IOB 904 can include, for example, two instances of an input/output logic element (IOL 915) in addition to one instance of the programmable interconnect element INT 911. As will be clear to those of skill in the art, the actual I/O pads connected, for example, to the I/O logic element 915 are manufactured using metal layered above the various illustrated logic blocks, and typically are not confined to the area of the input/output logic element 915.

In the pictured embodiment, a columnar area near the center of the die (shown shaded in FIG. 9) is used for configuration, clock, and other control logic. Horizontal areas 909 extending from this column are used to distribute the clocks and configuration signals across the breadth of the FPGA.

Some FPGAs utilizing the architecture illustrated in FIG. 9 include additional logic blocks that disrupt the regular columnar structure making up a large part of the FPGA. The additional logic blocks can be programmable blocks and/or dedicated logic. For example, the processor block PROC 910 shown in FIG. 9 spans several columns of CLBs and BRAMs.

Note that FIG. 9 is intended to illustrate only an exemplary FPGA architecture. The numbers of logic blocks in a column, the relative widths of the columns, the number and order of columns, the types of logic blocks included in the columns, the relative sizes of the logic blocks, and the interconnect/logic implementations included at the top of FIG. 9 are purely exemplary. For example, in an actual FPGA more than one adjacent column of CLBs is typically included wherever the CLBs appear, to facilitate the efficient implementation of user logic.

The present invention is thought to be applicable to a variety of systolic arrays configured for MIMO decoding. Other aspects and embodiments of the present invention will be apparent to those skilled in the art from consideration of the specification and practice of the invention disclosed herein. It is intended that the specification and illustrated embodiments be considered as examples only, with a true scope and spirit of the invention being indicated by the following claims.

What is claimed is:

1. A multiple input multiple output (MIMO) receiver circuit, comprising:
    input circuitry configured to provide a matrix of unresolved symbols from radio frequency signals received from a plurality of receive antennas;
    channel estimation circuitry coupled to the input circuitry and configured to construct a plurality of channel matrices, each channel matrix constructed from a set of channel transfer elements corresponding to a distinct subcarrier of a wireless channel, and the plurality of channel matrices including at least a first channel matrix corresponding to a first subcarrier and a second channel matrix corresponding to a second subcarrier;
    a preprocessing circuit coupled to the plurality of channel matrices, wherein the preprocessing circuit is configured to:
        receive input from the plurality of channel matrices; and
        interleave retrieved input from the plurality of channel matrices into an input matrix;
    a first systolic array including boundary cells and internal cells, wherein the preprocessing circuit is coupled to one of the boundary cells and a subset of the internal cells, and the boundary cells and internal cells are configured to perform triangulation and back-substitution on the input matrix to produce an output matrix;
    a second systolic array coupled to receive the output matrix of the first systolic array, wherein the second systolic array is configured to perform right and left multiplication operations and cross-diagonal transpose on the output matrix to produce a weighted matrix; and
    an output circuit coupled to the second systolic array and configured to multiply the weighted matrix by the matrix of unresolved symbols from the input circuitry to produce an estimate of isolated symbols corresponding to the unresolved symbols.

2. The receiver circuit of claim 1, wherein:
    the boundary cells, other than the one boundary cell coupled to one of the pre-processing circuits, are respectively coupled to receive input from the internal cells, and each internal cell is respectively coupled to one of the boundary cells or one of the internal cells to receive a first input, and each internal cell is respectively coupled to one of the internal cells or one of the respective preprocessing circuits to receive a second input;
    while the first systolic array is performing triangulation:
        the boundary cells are configured to store respective first residues as a result of triangulation of the input matrix and to provide respective inverted residues from the first residues; and
        the internal cells are configured to store respective second residues as a result of triangulation of the input matrix; and
    while the first systolic array is performing back-substitution:
        the boundary cells are configured to respectively multiply the inverted first residues with the first inputs to provide first outputs;
        the internal cells are configured to respectively multiply the first inputs with the second residues to provide intermediate results; and
        the internal cells are further configured to respectively add the intermediate results with the second inputs to provide second outputs.

3. The receiver circuit of claim 1, wherein the boundary cells and internal cells are configured to process input from each of the plurality of channel matrices within the interleaved input independently.

4. The receiver circuit of claim 3, wherein the boundary cells and internal cells are further configured to process interleaved input from the plurality of channel matrices serially.

5. The receiver circuit of claim 2, wherein the boundary cells and internal cells are further configured to maintain respective sets of the first and the second residues for each of the channel matrices.

6. The receiver circuit of claim 1, wherein the plurality of matrices includes a number of matrices greater than or equal to a greatest number of clock cycles required by any one of the internal cells or boundary cells of the first systolic array to process one matrix element of the plurality of channel matrices.

7. The receiver circuit of claim 1, wherein the plurality of matrices includes a number of matrices greater than or equal to a number of clock cycles required by one of the internal cells during triangulation.

8. A computer-implemented method of decoding multiple input multiple output (MIMO) signals, comprising:
    storing a first matrix of inputs from a MIMO receiver;
    storing a second matrix of inputs from the MIMO receiver;
    grouping elements of the first matrix elements of the second matrix corresponding to the same row and column as the elements of the first matrix;
    inputting the grouped elements into a first systolic array;
    triangularizing by a computer the grouped elements with the first systolic array to produce a third matrix;
    performing an inversion of the third matrix to produce a fourth matrix;
    performing a left multiplication on the fourth matrix to produce a fifth matrix;
    performing a cross-diagonal transpose on the fifth matrix to produce a sixth matrix;
    performing right multiplication on the sixth matrix to produce a seventh matrix;
    multiplying the seventh matrix with a selection vector to produce decoded MIMO signals; and
    outputting the decoded MIMO signals.

9. The computer-implemented method of claim 8, wherein the inversion of the third matrix is performed by the first systolic array.

10. The computer-implemented method of claim 8, wherein the left multiplication on the third matrix and right multiplication on the fourth matrix are performed by the first systolic array.

11. The computer-implemented method of claim 8, wherein the left multiplication, cross-diagonal transposition, and right multiplication are performed by a second systolic array.

12. The computer-implemented method of claim 8, wherein the grouped elements of the first and second matrices are stored in a grouped matrix.

13. The computer-implemented method of claim 9, wherein grouping is performed by a selection circuit that alternates the input of elements between the first and second matrices.

14. A multiple input multiple output (MIMO) decoder, comprising:
- an input circuit for receiving a plurality of channel matrices corresponding to a plurality of subcarriers, the plurality of channel matrices including at least a first channel matrix and a second channel matrix, wherein the first matrix is independent of the second matrix;
- a circuit means for interleaving the plurality of channel matrices; and
- a systolic array means for:
  - triangulating the interleaved matrices to produce a third matrix;
  - performing an inversion of the third matrix to produce a fourth matrix;
  - performing left multiplication on the fourth matrix with the interleaved plurality of channel matrices to produce a fifth matrix;
  - performing cross diagonal transpose on the fifth matrix to produce a sixth matrix;
  - performing right multiplication on the fourth matrix with the sixth matrix to produce a seven matrix; and
  - multiplying the sixth matrix with a selection vector.

15. The MIMO decoder of claim 14, wherein the circuit means is configured to interleave by grouping elements of the plurality of matrices having the same row and column index.

16. The MIMO decoder of claim 14, wherein the circuit means is configured to store the interleaved channel matrices.

17. The MIMO decoder of claim 14, wherein the systolic array means includes:
- a first systolic array means for triangulating the interleaved matrices to produce a third matrix and performing an inversion of the third matrix to produce a fourth matrix; and
- a second systolic array means for performing left multiplication on the fourth matrix with the interleaved plurality of channel matrices to produce a fifth matrix, performing cross diagonal transpose on the fifth matrix with the interleaved plurality of channel matrices to produce a sixth matrix, and performing right multiplication on the sixth matrix to produce a seven matrix.

18. The MIMO decoder of claim 14, wherein:
- the systolic array means includes an array of processing cells; and
- the plurality of matrices includes a number of matrices greater than or equal to the greatest number of clock cycles required by any one of the boundary cells or internal cells to process one matrix element of the interleaved matrices.

19. The MIMO decoder of claim 14, wherein:
- the systolic array means includes an array of processing cells; and
- the plurality of matrices includes a number of matrices greater than or equal to the greatest number of clock cycles required by one of the processing cells to process one matrix element of the interleaved matrices during triangulation.

20. The MIMO decoder of claim 18, wherein the array of processing cells are configured to process input from each of the plurality of matrices in the interleaved matrices independently.

* * * * *